United States Patent [19]

Avarne

[11] Patent Number: 5,371,796
[45] Date of Patent: Dec. 6, 1994

[54] DATA COMMUNICATION SYSTEM

[75] Inventor: Simon A. B. Avarne, Liphook, England

[73] Assignee: Racal-Datacom, England

[21] Appl. No.: 70,061

[22] Filed: Jun. 1, 1993

[30] Foreign Application Priority Data

Jun. 2, 1992 [GB] United Kingdom ............ 9211648.2

[51] Int. Cl.$^5$ .............................................. H04L 9/00
[52] U.S. Cl. ............................................ 380/23; 380/25
[58] Field of Search .................................... 380/23-25

[56] References Cited

U.S. PATENT DOCUMENTS

| | | | |
|---|---|---|---|
| 4,302,810 | 11/1981 | Bouricius et al. | 380/24 |
| 4,357,529 | 11/1982 | Atalla | 380/23 |
| 4,393,269 | 7/1983 | Konheim et al. | 380/25 |
| 4,453,074 | 6/1984 | Weinstein | 380/30 |
| 4,500,750 | 2/1985 | Elander et al. | 380/25 |
| 4,549,075 | 10/1985 | Saada et al. | 380/25 |
| 4,601,011 | 7/1986 | Grynberg | 364/900 |
| 4,652,698 | 3/1987 | Hale et al. | 380/24 |
| 4,656,474 | 4/1987 | Mollier et al. | 380/23 |
| 4,665,396 | 5/1987 | Dieleman | 380/23 |
| 4,667,670 | 6/1987 | Henderson, Jr. | 380/23 |
| 4,723,284 | 2/1988 | Munck et al. | 380/25 |
| 4,890,323 | 12/1989 | Beker et al. | 380/25 |
| 4,918,728 | 4/1990 | Matyas et al. | 380/25 |
| 4,941,176 | 7/1990 | Matyas et al. | 380/25 |
| 5,153,919 | 10/1992 | Reeds, III et al. | 380/44 |

*Primary Examiner*—Salvatore Cangialosi
*Attorney, Agent, or Firm*—Anna E. Mack

[57] ABSTRACT

In a data communication system a plurality of users are equipped with respective devices for computation and authentication of message authenticators. Each device stores a common cryptographic function; a common secret key and a respective non-secret offset for the key. They are programmed to perform the functions of: (i) computing and outputting an authenticator for an entered message using the cryptographic function and key combined with the respective offset; and (ii) computing an authenticator for an entered message using the cryptographic function and key combined with any entered offset, comparing that authenticator with one received with the message and displaying a "pass" or "fail" decision. The devices are incapable of displaying or otherwise outputting any authenticator computed using any offset other than its respective stored offset, however. In this way it can be ensured that a transmitted authenticator can act as a verifiable "signature" to a message uniquely identifying the sender.

6 Claims, 3 Drawing Sheets

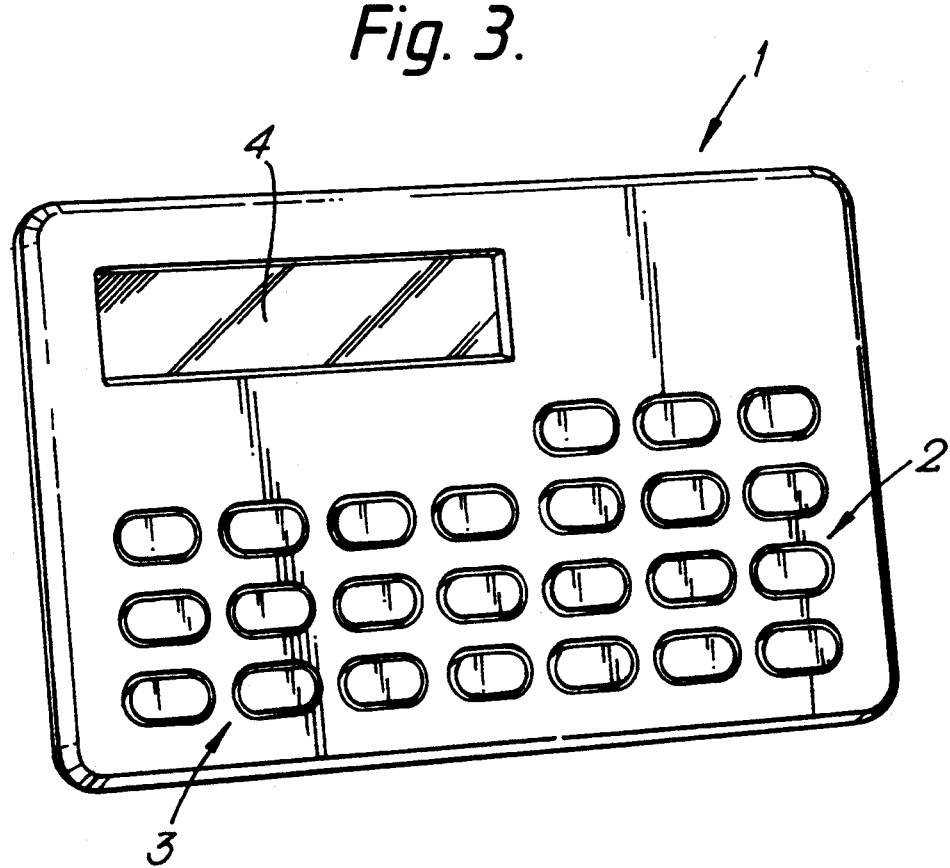

DATA COMMUNICATION SYSTEM

BACKGROUND

The present invention relates to data communications and more particularly is concerned with techniques for the authentication both of messages flowing across a communications network and of their senders—factors of great importance e.g. in the field of electronic funds-transfer and for other systems carrying financial or other commercially-sensitive information.

In such systems it is clearly important to be able to detect at the receiving end any active attack upon, or other corruption of, a message which might have taken place in the course of its transmission across the network. An active attack might take the form of an interceptor adding, removing or altering information in the message with criminal or vexatious intent. While it may be almost impossible to prevent an active attack there are various mechanisms which aim to ensure that such an attack will be detected and hence can be rendered nugatory. The most common depends upon the generations prior to transmission, of a cryptographic checksum or message authentication code—termed herein an "authenticator"—from the information contained in the message, which is then appended to the message for transmission. The theory underlying this approach is that if the recipient himself computes the expected authenticator from the message as received using the same cryptographic transformation, and finds it to disagree with the authenticator actually received with the message, then he will know that the message has been altered in some way. If on the other hand the expected and received authenticators match then he knows with a high degree of probability that the message has not been altered, that probability increasing with the length of the authenticator. An example of this in common usage is the system described in American National Standards Institute (ANSI) standards X9.9 and X9.19. Within these standards the cryptographic algorithm is the Data Encryption Algorithm as described in ANSI X3.92, the cryptographic key is a 56-bit DEA key and the authenticator is a 32-bit value appended to the message.

The success of such a system of message authentication of course depends on maintaining the secrecy of the cryptographic key from would-be interceptors. In any such system the same key must, however, be known to, or at least available for the computation of authenticators by, both the sender and recipient. In known systems this raises the possibility that one user might impersonate another and, since the foregoing possibility exists, that a user might attempt to repudiate a genuine transaction. That is to say, while a recipient may be certain from the contents of a received authenticator that any given message was received in the form in which it was originally sent, the authenticator itself cannot guarantee that the sender was the person whom the message purports it to be because the same authenticator generating key is available to all users.

SUMMARY OF THE INVENTION

The present invention seeks to address this problem and accordingly in one aspect resides in a data communication system in which a plurality of users are equipped with respective devices each for the computation and for the verification of message authenticators; each such device storing a common cryptographic function, a common secret cryptographic key and a respective non-secret offset for said key; and each such device being programmed to perform selectably the functions of: (i) computing and outputting an authenticator for a message inputted to the device, using said cryptographic function and said key combined with the respective stored offset; and (ii) computing an authenticator for a message inputted to the device, using said cryptographic function and said key combined with an inputted offset, comparing that authenticator with an authenticator inputted to the device and outputting an indication of verification or non-verification based on said comparison; but each said device being incapable of outputting an authenticator computed using said cryprographic function and said key combined with any offset other than its respective said stored offset. An "offset" in this invention is a value which effectively modifies the common cryptographic key in a respective manner.

In the operation of this system for message authentication a received authenticator will only be verified by a recipient if he has performed the aforesaid function (ii) using the key offset which corresponds to the device of the sender of the message. An essential feature of the system, however, is that the only user who can output (and thus transmit) an authenticator using the offset which corresponds to his own device is that user himself. The authenticator can therefore act as a verifiable "digital signature" identifying the sender of a message, the value of this offset effectively being the sender's ID within the system.

It is important that the (unmodified) common key stored in the devices of this system remains secret, but the offsets corresponding to respective users need not. Indeed the sender's respective offset must be made known to the recipient in order for him to perform the authenticator verification function. If a user should send a message with an authenticator computed with his own device and respective offset but purports to be some other user, however, the received authenticator will not match the authenticator computed by the recipient using the purported user's offset and he will therefore know that the message is not genuine. Furthermore, the knowledge of users' offsets by an unauthorized person does not provide any means for subverting the system without knowledge also of the common key.

The invention also resides per se in an aforesaid device for use in the above-defined system. In a preferred embodiment each such device is in the form of a portable token akin to a hand-held calculator, having a key pad for the entry of message data, authenticators to be verified and corresponding offset values, and for entering the commands to perform the aforesaid functions (i) and (ii), and a display for indicating computed authenticators and verification or non-verification decisions. Additionally or alternatively an electrical interface may be provided for the direct input and output of messages and authenticators from/to an associated terminal apparatus. The physical and electrical construction of the token should be such as to prevent anyone from reading the secret common key, changing the stored offset value or changing the functionality of the token—and in particular from deriving an output of any authenticator computed during the first phase of the above-defined verification function (ii). In practice this can readily be achieved by implementing all of the token's functions in a single microprocessor chip.

In another aspect of the invention, since any message with its corresponding authenticator will serve to verify its sender the same equipment as provided in the above-defined system can be used primarily for the purpose of verifying members of a group using a communications network, in circumstances which do not require the authentication of messages as such, but where possession of an authorized device is a prerequisite to membership of the group. For example there can be considered a distributed database system to which a large number of different users may wish to obtain access. Each database operator might not need to know the individual identities of all of the users who may request access at any time but does need to know that any person to whom access is to be given has been authorized by the allocation of a said device. In this aspect the user who wishes to verify the authenticity of another user generates a random number which is issued as a "challenge" to that user. This number is then processed by that user in accordance with function (i) of his device, where the "challenge" number constitutes the inputted message in the invention as defined above, and outputs a "response" number (which constitutes the authenticator computed for that message). This "response" number, together with that user's offset, is then transmitted to the first user who uses his own device (or equivalent) to perform the verification function (ii) of the invention where the "challenge" number constitutes the inputted message and the "response" number constitutes the inputted authenticator.

The invention will now be more particularly exemplified with reference to the accompanying drawings.

BRIEF DESCRIPTION OF THE DRAWINGS

FIG. 3 is a perspective view of an individual token for use in a system according to the invention.

DETAILED DESCRIPTION OF THE PREFERRED EMBODIMENTS

Figure 1:
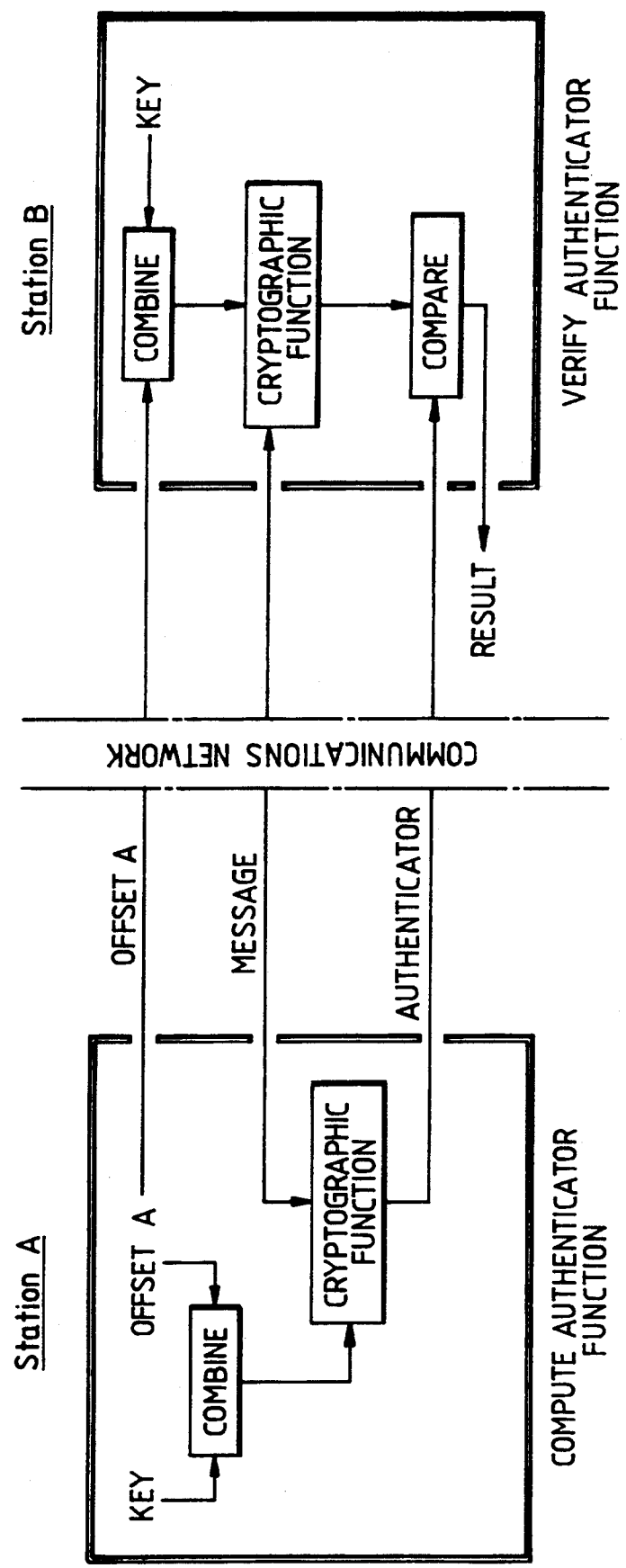
FIG. 1 is a diagram illustrating the functions performed in computing and verifying an authenticator in connection with the transmission of a message in a system according to the invention.

Referring to FIG. 1, this illustrates two user stations A and B within an overall data communication system comprising many such stations between which messages are sent, e.g. payment instructions within a banking network. At each station the user is equipped with a respective electronic token for use in computing authenticators to be appended to messages sent by that user and for verifying authenticators received with messages from other users. Each such token has been initialized with a common cryptographic function (e.g. the Data Encryption Algorithm of ANSI X3.92), a common secret cryptographic key and an individual offset value for that key. Each token has also been programmed to perform two distinct functions, namely: (i) to compute and display an authenticator from an inputted message using the common cryptographic function and the common key as modified by that token's own stored offset; and (ii) to compute an authenticator from an inputted message using the common cryptographic function and the common key as modified by an inputted offset, compare it with an inputted authenticator and display the result of that comparison as a pass or fail; but it cannot perform any other function using the secret key. In particular, the token cannot display or otherwise output any authenticator computed in the course of its verification function (ii), but can only compare it as aforesaid and display the result.

An individual token for use in this system may take the form indicated in FIG. 3, namely a hand-held device 1 similar in appearance to a conventional personal calculator (the usual functions of which it may also perform). A keypad 2 is provided for the entry of data and a series of function keys 3 for entry of the commands appropriate to its operation. A liquid crystal display 4 is provided for checking the entered data, issuing prompts and displaying authenticators and pass/fail decisions. Preferably operation of the token itself requires entry of a user-defined PIN, to minimize the risk of its misuse if lost or stolen.

Returning to FIG. 1 it is assumed that the user at station A has a message to send to station B. He enters the message into his token and enters the command for the token to perform its computation function (i). The message is therefore encrypted under the common key as modified by that token's stored offset (offset A) to produce and display a corresponding authenticator. The message, together with this authenticator and the value of the offset A is then transmitted over the communications network to station B. The user at station B wants to verify that the message has been received without alteration and also to verify that the sender of the message is who it is purported to be, namely user A. He therefore enters the message, the received authenticator and the received offset A into his own token and enters the command for the token to perform its verification function (ii). The message is therefore encrypted under the same key as modified by the same offset as in the user A's token to produce (but not display) an authenticator which is then compared with the received authenticator, and if it matches the token displays a "pass" result. By this means user B can be confident that the message has been received without alteration. Since he also knows that the sender of the message must have had the authenticator displayed to him in order to transmit it and that the only token which can display that authenticator in response to that message is the one which has been initialized with offset A then he can also be confident that it was actually sent by user A.

Figure 2:
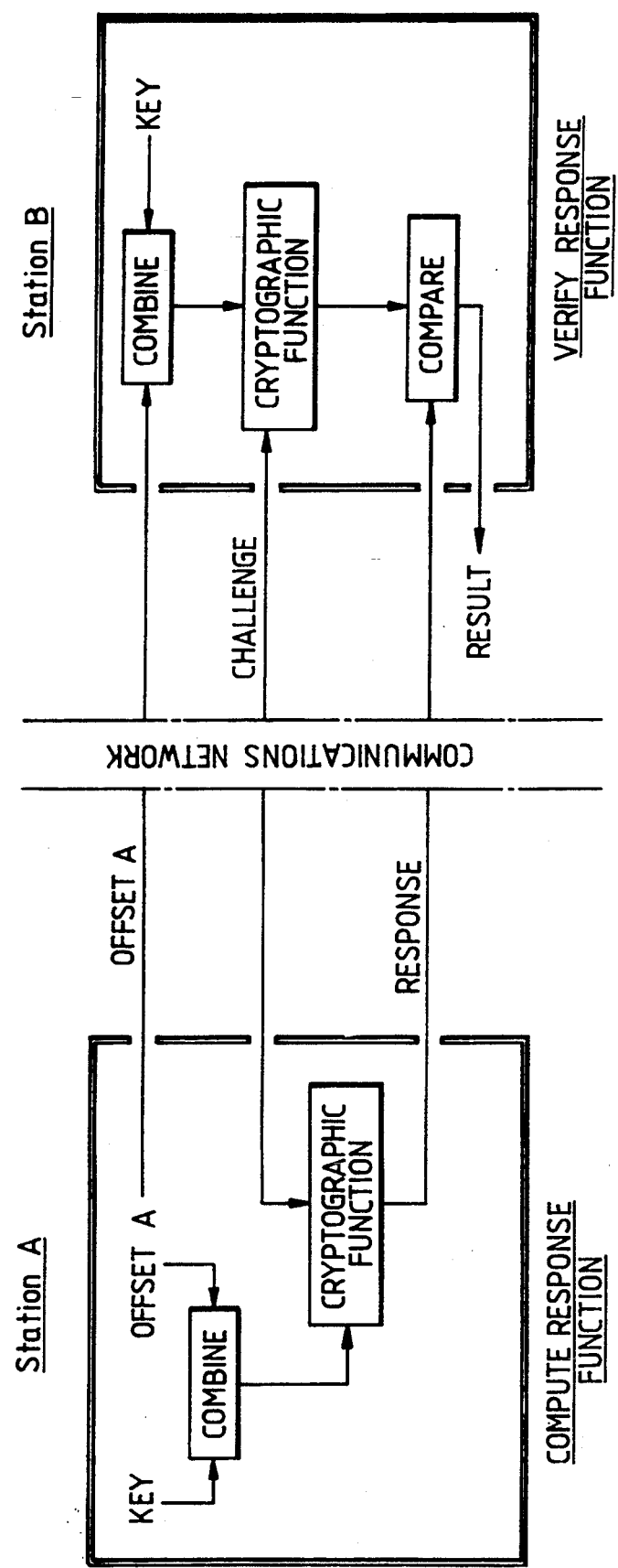
FIG. 2 is a diagram illustrating the functions performed in computing and verifying a response to an identification challenge in a system according to the invention.

These same tokens can be used in any other communication system where users wish to be able to verify the identity of other users but without necessarily involving message authentication as such. An example of this is shown in FIG. 2. In this case the user at station B wishes to verify that the user at station A is an authorized user of the network. He accordingly uses an additional function of his token to generate and display a random number, which is transmitted to user A as a "challenge". User A then uses his token to encrypt that number under the common key as modified by his offset A to produce and display a "response" number. He transmits this number together with the value of his offset A to user B who enters them into his token and performs the same verification function as if the original "challenge" number was a received message and the "response" number was the corresponding authenticator. If a "pass" result is displayed, he similarly knows that user A is genuine because only that user could have had knowledge of the given "response" from the "challenge" using offset A in the encryption.

I claim:

1. A data communication system comprising a plurality of stations for the transmission and reception of message signals, each said station comprising:

memory means storing a cryptographic function and a secret cryptographic key both of which are common to all of said stations, said memory means further storing a non-secret offset for said key which is individual to the respective said station;

input means for receiving a first message signal to be transmitted to one of the other said stations; combining means for combining said stored cryptographic key with said stored individual offset to generate a first modified key; processing means for encrypting said first message signal to be transmitted, using said stored cryptographic function with said first modified key, compute an authenticator signal for said first message signal to be transmitted; and output means for outputting said authenticator signal;

said input means further being for receiving a received message signal and a received said authenticator signal transmitted from another said station and a received said offset individual to said another station; said combining means further being for combining said stored cryptographic key with said received offset individual to said another station to generate a second modified key; said processing means further being for encrypting said received message signal, using said stored cryptographic function with said second modified key, to compute a second authenticator signal for said received message signal; comparing means for comparing said received authenticator signal and said second authenticator signal; and said output means further being for providing an indication signal of verification or non-verification according to whether or not said received authenticator signal and said second authenticator signal are identical but without outputting said second authenticator signal.

2. A data communication system comprising a plurality of stations, operable for any said station to verify the authenticity of any other said station, each said station comprising:

memory means storing a cryptographic function and a secret cryptographic key both of which are common to all of said stations, said memory means further storing a non-secret offset for said key which is individual to the respective said station;

generating means for generating a random challenge message signal to be issued to one of said stations;

input means for receiving a received said random challenge message signal issued from another said station; combining means for combining said stored cryptographic key with said stored individual offset to generate a first modified key; processing means for encrypting said received random challenge message signal, using said stored cryptographic function with said first modified key, to compute a response signal to said received random challenge message signal; and output means for outputting said response signal;

said input means further being for receiving a received said response signal, transmitted from said one station, to said random challenge message signal, and a received said offset individual to said one station; said combining means further being for combining said stored cryptographic key with said received offset individual to said one station to generate a second modified key; said processing means further being for encrypting said random challenge message signal, using said stored cryptographic function with said second modified key, to compute a second response signal to said random challenge message signal; comparing means for comparing said received response signal and said second response signal; and said output means further being for providing an indication signal of verification or non-verification according to whether or not said received response signal and said second response signal are identical but without outputting said second response signal.

3. A data communication system including at least a first station and a second station, said first and second stations respectively including first and second memory means for storing a cryptographic function and a secret cryptographic key both of which are common to said first and second stations, wherein said improvement in said data communication system comprises:

said first station further including:

said first memory means further including a non-secret first offset for said key which is individual to said first station;

first input means for receiving a first message signal;

first combining means for combining said cryptographic key with said first offset to generate a first modified key;

first processing means for encrypting said first message signal with said first modified key to generate a first authenticator signal; and first transmission means for transmitting said first offset, said first message signal and said first authenticator signal to said second station;

and said second station further including:

said second memory means further including a non-secret second offset for said key which is individual to said second station;

second input means for receiving said first offset, said first message signal and said first authenticator signal from said first station;

second combining means for combining said cryptographic key stored in said second station with said first offset to generate a second modified key;

second processing means for generating a second authenticator signal from said first message signal;

first comparing means for comparing said first authenticator signal with said second authenticator signal to generate a first indication signal indicating whether said first and second authenticator signals are identical; and first output means for outputting said first indication signal but without outputting said second authenticator signal.

4. A data communication system according to claim 3 wherein said first message is provided by a user of said first station.

5. A data communication system according to claim 3 wherein said second station further includes:

challenge generating means for generating said first message, said first message comprising a random challenge message signal to be issued to said first station; and second transmission means for transmitting said first message to said first station.

6. A data communication system according to claim 3 wherein said second station further includes:
- said second input means further being for receiving a second message signal;
- said second combining means further being for combining said cryptographic key with said second offset to generate a third modified key;
- said second processing means further being for encrypting said second message signal with said third modified key to generate a third authenticator signal; and
- second transmission means for transmitting said second offset, said second message signal and said third authenticator to said first station; and wherein said first station further includes:
- said first input means further being for receiving said second offset, said second message signal and said third authenticator signal from said second station;
- said first combining means further being for combining said cryptographic key stored in said first station with said second offset to generate a fourth modified key;
- said first processing means further being for generating fourth authenticator signal from said second message signal;
- second comparing means for comparing said third authenticator signal with said fourth authenticator signal to generate a second indication signal indicating whether said third and fourth authenticator signals are identical; and
- second output means for outputting said second indication signal but without outputting said fourth authenticator signal.

* * * * *